Oct. 26, 1948.  C. E. MORLEY  2,452,316
ADJUSTABLE SUPPORT
Filed Feb. 12, 1948
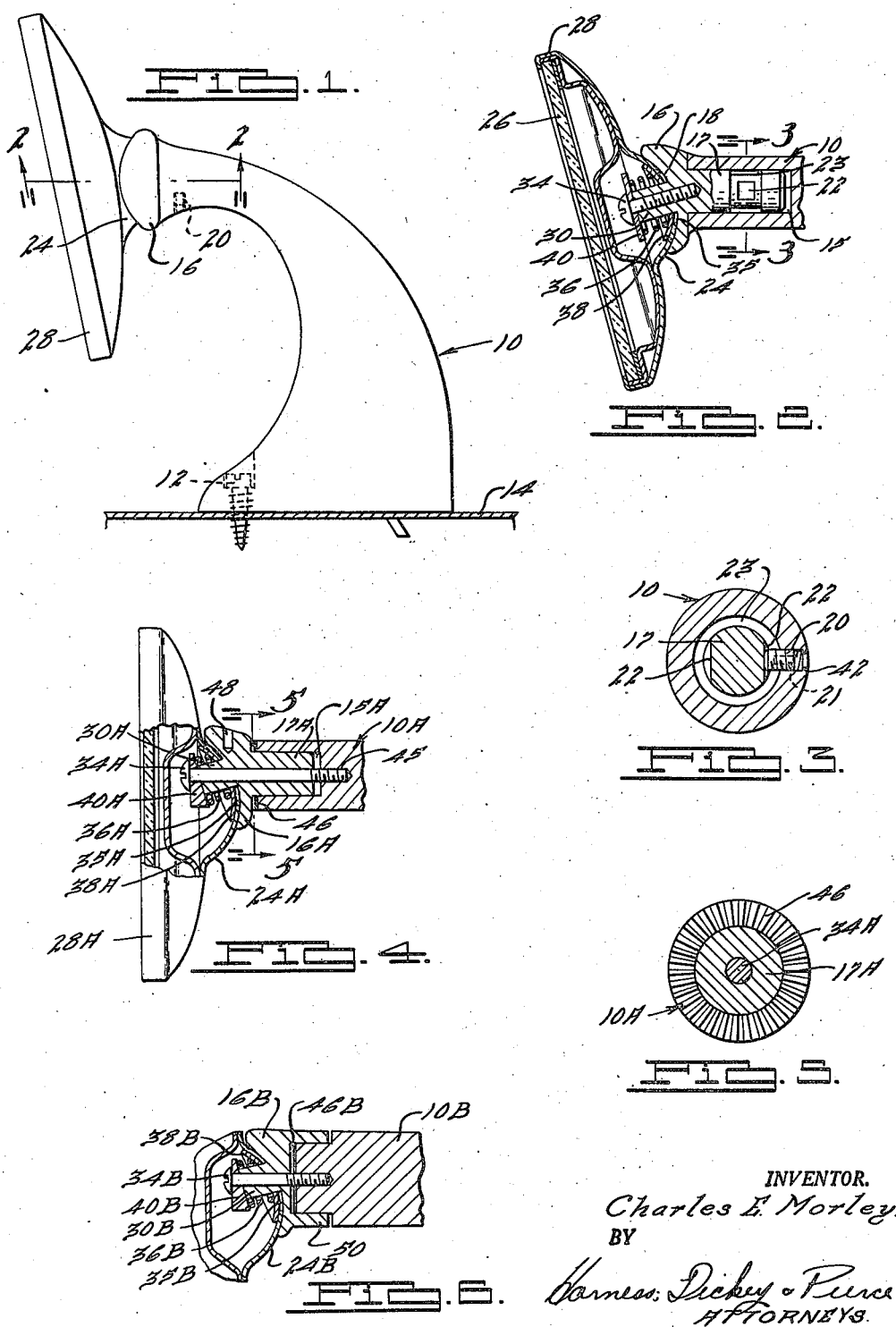
INVENTOR.
Charles E. Morley.
BY
Harness, Dickey & Pierce.
ATTORNEYS.

Patented Oct. 26, 1948

2,452,316

UNITED STATES PATENT OFFICE 2,452,316

ADJUSTABLE SUPPORT

Charles E. Morley, Detroit, Mich.

Application February 12, 1948, Serial No. 7,822

9 Claims. (Cl. 248—205)

The present invention relates to the construction of universal joint-type supporting and connecting means. Although particularly useful in connection with supports such as are employed in supporting outside rear view mirrors for motor cars, and analogous uses where a supporting joint of neat appearance but which is capable of withstanding severe usage and the effects of the elements, it will be observed that the utility of the invention is not restricted to the particular field mentioned, and it will be appreciated that the principles thereof are readily applicable wherever an efficient but inexpensive universal joint-type support is required.

An important advantage of the invention is that it provides a support of attractive appearance, the joint mechanism itself being of concealed character, permitting the adjoining supporting and supported parts to be contoured smoothly, or treated in any desired ornamental manner, the joint being hardly noticeable when incorporated in a complete assembly.

It is an important object of the invention to provide such an improved universally adjustable support which permits a wider range of adjustment than previously known supports comparable in cost, appearance, simplicity, and inexpensiveness of construction.

Another and more detailed object of the invention is to provide an improved ball and socket-type universally adjustable support having an angularly disposed socket portion adjustable independently of its coacting ball part to impart a wide range of adjustment.

Still another object is to provide such an improved ball and socket-type adjustable support which renders a supported object carried thereby virtually theft-proof.

Other objects and advantages will be apparent upon consideration of the present disclosure in its entirety.

In the drawings,

Figure 1 is a plan view of a rear view mirror construction incorporating an adjustable support constructed in accordance with the principles of the present invention;

Figs. 2 and 3 are cross sectional views taken respectively on the lines 2—2 and 3—3 of Fig. 1 and looking in the direction of the arrows;

Fig. 4 is a cross sectional view corresponding to Fig. 2, showing a modified construction;

Fig. 5 is a sectional view taken substantially on the line 5—5 of Fig. 4 and looking in the direction of the arrows; and Fig. 6 is a sectional view similar to Fig. 4 but with a part of the mirror head removed, showing another modified construction.

Referring now to the drawings, reference character 10 designates generally a supporting bracket or arm adapted to be secured as by fastening means such as the screw 12 to a motor vehicle body fragmentarily indicated at 14. The bracket arm 10 is illustrated as typifying a support by which my improved adjustable coupling and supporting means is adapted to be carried and with which it is adapted to coact. The arm is indicated as of such curved contour that at its outer extremity it is directed substantially at right angles to the plane of its base portion, and to the body 14 to which it is attached, the outer extremity of the arm being of substantially circular and of reduced cross section and provided with a cylindrical open-ended bore 15 within which is rotatably fitted a stem 17 provided with an enlarged head portion 16 at its outer end and which overhangs but substantially conforms to the dimensioning of the outer extremity of the arm 10 so as to present a generally smooth appearance when assembled therewith in the manner shown, the head portion 16 being provided with a spherical ball socket 18 laterally offset from the axis of the stem 17. The stem 17 is held against removal, and is normally held against rotation with respect to the arm 10, by means of a set screw 20 which may engage either of a pair of diametrically opposed flatted portions 22 of the stem positioned to define the extremes of adjustment of the socket head 16. The flats 22 are formed at the bottom of a peripheral slot 23 into which the screw projects at all times and the metal of the arm may be peened over or otherwise formed to overlie the head of and block removal of the screw. The mirror is thus held against unauthorized removal at all times. By tightening the setscrew, the head may be held in a desired angular position so that the socket portion 18 thereof occupies a position closer to one side or the other of the arm, the range of adjustment of the device being thereby increased to the extent of the offsetting of the socketed portion.

Fitted in the socketed portion 18 is a partly spherical embossment 24 formed upon the integral sheet metal shell 25 which serves as an enclosure for the reflective mirror element 26, which may be constructed of glass in the usual manner and retained therein in any suitable fashion as by rolling the rim of the shell in the manner indicated at 28. An integral stud portion 30 projects radially from the socket 18 and may be cast integrally with the head 16. It will be observed that by reason of the offsetting of the spherical socket 18, the stud portion 30, in order to extend radially with respect to such socket, is arranged at an angle to the axis of rotation of the stem 17, which defines the axis of rotation of the socketed head itself.

The stud 30 is preferably of square or other non-circular cross section externally and axially drilled and tapped as indicated at 32 to receive the mirror shell retaining screw 34. The opening 35 in the shell embossment 24 is enlarged to permit rocking adjustment of the mirror shell in the socket 18, but it will be observed that the size of the opening 35 is limited by the dimensions of the head 16, since it is undesirable to permit any part of the opening 35 to project beyond the head when the mirror is rocked to the extreme angle of its adjustment. The embossed portion of the mirror shell is yieldably retained in frictional engagement with the socket 18 by means of a spring 36 acting upon the interior of the embossment through the agency of a spherical washer 38 conforming in contour to the interior of the embossment but the central opening (undesignated) in which fits the external contour of the stud 32 so that the washer and spring are keyed thereby against rotation in event the mirror shell is rotated about the axis of the stud. The upper spring abutment is formed by a washer 40 held upon the outer end of the stud 32 by the screw 34.

It will be observed that by virtue of the fact that the entire spherical socketed head and stem-containing socket 18 may be rotated about an axis perpendicular to the mirror-supporting extremity of the arm 10, represented by the axis of rotation of the stem 17, an additional range of angular adjustment of the mirror is provided corresponding to the angle between the axis of rotation of stem 17 and the axis of stud 32. Since the screw 34 is covered by the glass 26, which is firmly held in the shell 25 by the rolled rim 28, and the headed stem portion 17 is held against removal by blocking the screw 20 in the manner described, the mirror head is effectively locked against unauthorized removal or theft.

In the modified construction shown in Figs. 4 and 5, in which parts corresponding to those previously described are designated by like reference characters distinguished by the addition of the letter "A" to each, the stud portion 30A is similarly arranged at an angle to the axis of rotation of the stem 17A though occupying a position which is substantially radial with respect to the socket 18A, but the screw 34A extends through the stud 30A in a direction which is angular with respect to the stud portion but axial wtih respect to the supporting stem portion 17A. The screw 34A is elongated and threaded into a suitably tapped hole 45 formed axially in the arm 10A at the bottom of the opening 15A in which the stem 17A is rotatably fitted. The screw 34A thus serves to secure the headed stem portion 17A rotatably upon the end of the arm 10A. In place of the simple washer 40 employed in the first embodiment, a wedge-shaped washer 40A is arranged beneath the head of the screw 34A, the upper and lower faces of the washer 40A being so inclined that the lower face thereof is substantially perpendicular to the stud 30A while the upper face thereof is perpendicular to the axis of the screw 34A. The spring 36A is similarly retained by the washer 40A and frictionally retains the embossed portion 24A. It will also be observed however that the spring 36A, reacting against the head of the screw 34A and against the socket element 16A, urges the socket element into yieldable engagement wtih the end of the arm 10A. The engaging portions of the arm 10A and the underside of the head 16A are preferably provided with radial or other suitably formed serrations 46 yieldably opposing rotation of the socket head 16A. Suitable means facilitating rotation of the head when desired may be provided in the form of a substantially radial opening 48. A nail, small Allen wrench (such as may be employed to attach the complete mirror assembly to its support), or any other suitable tool may be thrust into the hole 48 and used as a lever when it is desired to rotate the head 16A. By virtue of the provision of the serrations 46, the mirror itself may be rotated and rocked more easily than the head can be turned about the axis of the screw 34A. The rotatability of the head 16A may accordingly be employed for preliminary or coarse adjustments, such as are desirable in the original installation of a mirror support, whereas subsequent finer adjustments may be effected in the usual way during normal use by rotating and rocking the mirror shell without upsetting the coarse adjustment initially effected by rotating the head to the desired angular position.

The modified construction illustrated in Fig. 6 is essentially similar to that shown in Figs. 4 and 5, and parts corresponding to those previously described are designated by like reference characters distinguished by the addition of the letter "B" to each.

The head portion 16B of the embodiment of Fig. 6 is provided with a reversely extending skirt 50 which projects back over the end of the arm 10B although the end of the arm is reduced to receive the skirt and to impart a substantially smooth continuous appearance to the parts. The skirt 50 and connected head portion 16B may be of hexagonal cross section or other noncircular contour to adapt these portions to receive a conventional wrench, whereby the socketed head may be rotated after the fashion of rotation of the head 16A of the embodiment last described. Rotation of the socketed head assembly is similarly yieldably opposed by the serrated portions 46B. It will be noted that in this embodiment the stem portion which projects into the arm in the other embodiments is dispensed with, and the screw 34B, shorter than the screw 34A of the embodiment last described, extends into a tapped axial hole 45B formed in the extremity of the arm 10B. Other portions of the embodiment of Fig. 6, being arranged and functioning similarly to those of the embodiment last described, will require no detailed redescription.

While it will be apparent that the preferred embodiments of the invention herein described are well calculated to fulfill the objects and advantages first above stated, it will be appreciated that the invention is susceptible to variation, modification and change without departing from the fair meaning and proper scope of the appended claims.

I claim:

1. Adjustable supporting means of the ball and socket type comprising in combination with a supporting element, a socketed member having a generally spherical socket therein rotatably secured to said element for bodily rotation about a predetermined axis, said socket being angularly tilted with respect to said axis, and a coacting partly spherical ball portion slidably interfitted with said socket for rocking and rotary adjustment with relation to said socketed member and for bodily rotation therewith.

2. In combination with means as set forth in claim 1, friction mechanism yieldably opposing rocking of the ball portion, and separate restraining portions for opposing rotary adjustment of the socketed member with respect to said supporting element.

3. In combination with means as set forth in claim 1, a securing stud extending substantially radially from the deepest portion of the socket and at an angle to said axis, said ball portion being hollow and having an opening therein larger than and fitted over the stud, and means including a spring within the ball portion opposing separation of the ball and socket.

4. In combination with means as set forth in claim 1, a securing stud extending substantially radially from the deepest portion of the socket and at an angle to said axis, a headed anchoring element extending through at least a part of said stud at an angle thereto but substantially concentric with said axis of rotation, the socketed member being rotatable on said anchoring element, said ball portion being hollow and having an opening therein larger than and fitted over the stud and anchoring element, and means including a spring within the ball reacting against the ball portion and anchoring element and urging the ball portion into the socket and the socketed member toward the supporting element.

5. In combination with means as set forth in claim 1, a securing stud extending substantially radially from the deepest portion of the socket and at an angle to said axis, a headed anchoring element extending through at least a part of said stud at an angle thereto but substantially concentric with said axis of rotation, the socketed member being rotatable on said anchoring element, said ball portion being hollow and having an opening therein larger than and fitted over the stud and anchoring element.

6. In combination with means as set forth in claim 1, a securing stud extending substantially radially from the deepest portion of the socket and at an angle to said axis, a headed anchoring element extending through at least a part of said stud at an angle thereto but substantially concentric with said axis of rotation, the socketed member being rotatable on said anchoring element, said ball portion being hollow and having an opening therein larger than and fitted over the stud and anchoring element, means including a spring within the ball reacting against the ball portion and anchoring element and urging the ball portion into the socket and the socketed member toward the supporting element, and detent means yieldably opposing relative rotation of the socketed member and supporting element including frictionally engageable portions carried by said last-mentioned element and member and urged together by said spring.

7. Means as set forth in claim 1 including a stem concentric with said axis rotatably interfitted with respect to said supporting element.

8. Means as set forth in claim 1 including a collar concentric with said axis rotatably interfitted with respect to said supporting element.

9. In combination with means as set forth in claim 1 including an anchoring element rotatably securing the socketed member to the supporting element, the ball portion being hollow and the anchoring element extending from a deep portion of the socket inwardly through and into the interior of the ball portion, a friction member surrounding the anchoring element within the ball portion and bearing against the interior of said ball portion, spring means also within the ball and reacting against the friction member and against the anchoring element to yieldably oppose rocking adjustment of the ball portion, and keying portions carried partly by the socketed member and partly by the friction member, and at least a part of which keying portions extends at an angle to said axis of rotation.

CHARLES E. MORLEY.

REFERENCES CITED

The following references are of record in the file of this patent:

UNITED STATES PATENTS

| Number | Name | Date |
| --- | --- | --- |
| 2,226,482 | Sarnes | Jan. 16, 1939 |
| 2,386,042 | Elzeer | Oct. 2, 1945 |